United States Patent [19]

McClellan

[11] 4,407,453
[45] Oct. 4, 1983

[54] DIFFUSION APPARATUS FOR GATED IRRIGATION PIPES

[76] Inventor: Gary C. McClellan, Rte. #2, P.O. Box 3255, Vale, Oreg. 97918

[21] Appl. No.: 314,996

[22] Filed: Oct. 26, 1981

[51] Int. Cl.³ .............................................. A01G 25/00
[52] U.S. Cl. .................................................... 239/145
[58] Field of Search ............... 239/107, 145, 504, 551, 239/552, 517, 516, 562, 542; 251/326; 405/39, 40, 43, 45, 87

[56] References Cited

U.S. PATENT DOCUMENTS

| 951,991 | 3/1910 | Hase | 239/145 |
|---|---|---|---|
| 2,769,668 | 11/1956 | Richards | 239/145 |
| 2,970,801 | 2/1961 | Lampert | 251/326 |
| 2,975,796 | 3/1961 | Tallman | 251/326 |
| 3,054,564 | 9/1962 | Flodman | 239/512 |

FOREIGN PATENT DOCUMENTS 539567 8/1977 U.S.S.R. ............................. 239/145

Primary Examiner—Andres Kashnikow
Assistant Examiner—Jon M. Rastello
Attorney, Agent, or Firm—Paul F. Horton

[57] ABSTRACT

Diffusion apparatus for gated irrigation pipes including a gate retainer slidingly engaging the pipe to selectively control water dispensed therefrom, and a water diffuser which removeably connects directly to the gate retainer and is moveable therewith. The diffuser includes a framework which may be water porous and a water porous covering of fine meshed screen or bristles for diffusion of the water. The covering and framework together form a channeled or trough-like diffuser. The diffuser is provided with a pin which engages a receiving slot on the gate retainer to hold the diffuser in place. Use of the apparatus prevents soil erosion and unwanted furrowing of the soil at the outlets of gated irrigation pipes.

13 Claims, 7 Drawing Figures

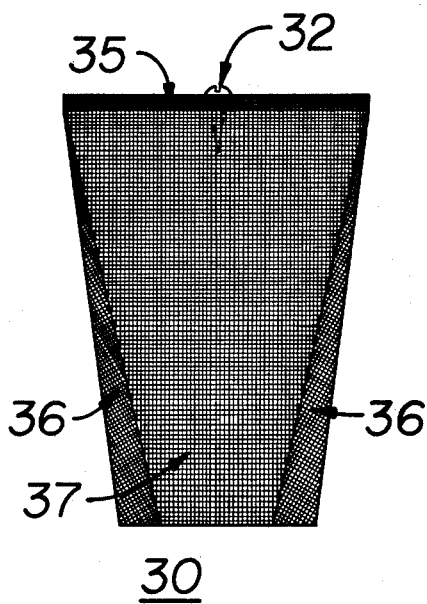
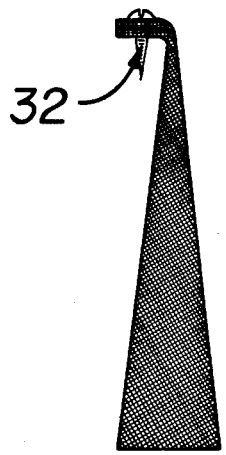
Fig. 4  Fig. 5
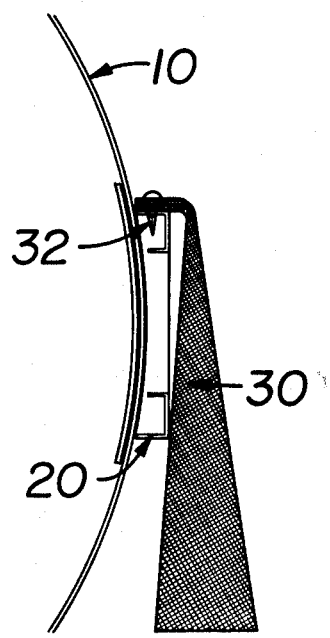
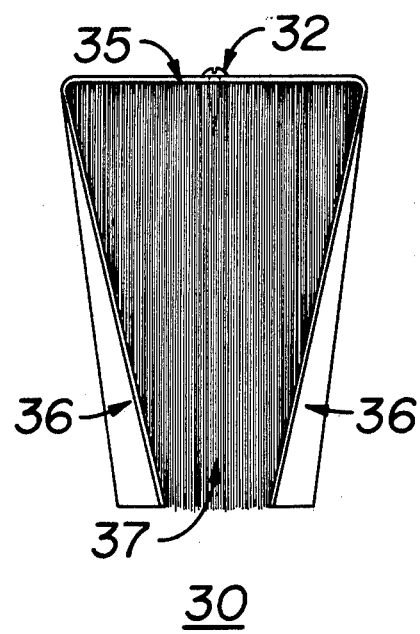
Fig. 6  Fig. 7

DIFFUSION APPARATUS FOR GATED IRRIGATION PIPES

BACKGROUND OF THE INVENTION

1. Field of the Invention

This invention relates to agricultural irrigation systems in general and, more particularly, to gated irrigation systems and water diffusing apparatus therefor.

2. Description of the Prior Art

Gated irrigation pipe serves to transport water to crops and is used particularly in areas of varying land slope. In low lying areas the pressure within the gated pipe is significantly increased and even in upper lying areas where the conditioned soil has a slope, a farmer irrigating with gated pipe can, in a very short time, have sizeable holes cut into the top of each of his corrugates. Not only are tons of soil washed out of the field by the unimpeded water flow from the gates but the erosion of some corrugates and the soil built up around other corrugates prevent the even distribution of water with resultant crop damage.

Several devices, as typified by the inventions of V. L. Shotton, U.S. Pat. No. 3,429,125 and G. M. Pollart, U.S. Pat. No. 4,058,261, have been constructed to alleviate these problems. The Shotton and Pollart types of devices are, however, plagued with their own particular problems. Currently, gated pipe having gate retainers which slidingly engage the walls of the pipe to selectively control water flow through openings in the pipe is in widespread useage. The Shotton type of diffusion device does not permit attachment to the pipe or gate retainer and the Pollart type of apparatus does not permit attachment with gate retainer in place. Additionally, both types of devices are prone to excessive clogging by debris carried by the water and need repetitive time-consuming maintenance.

SUMMARY OF THE INVENTION

The present invention comprises a gate retainer which slidingly engages the walls of gated irrigation pipe for control of water flow therefrom and a trough-shaped diffuser which is readily attachable and detachable to the gate retainer and moveable therewith for the prevention of soil erosion. A more comprehensive description may be found in the appended claims.

It is therefore a primary object of the present invention to provide apparatus for the control and diffusion of water from gated pipes. It is also an important object of the present invention to provide self-cleaning water diffusion apparatus.

It is a further object of the present invention to provide a water diffuser which is directly attachable to a gate retainer and moveable therewith.

Another object of the present invention is to provide a water diffuser which is light, small, and which may be readily attached and removed from gated irrigation pipe.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 4 is a front elevation of a fine meshed screen water diffuser of the present invention.

FIG. 5 is a side elevation of the diffuser of FIG. 4.

FIG. 6 is a side elevation of the apparatus of the present invention shown attached to a gated pipe.

FIG. 7 is a second embodiment of the water diffuser of the present invention showing use of bristles.

DETAILED DESCRIPTION OF THE INVENTION

Figure 1:
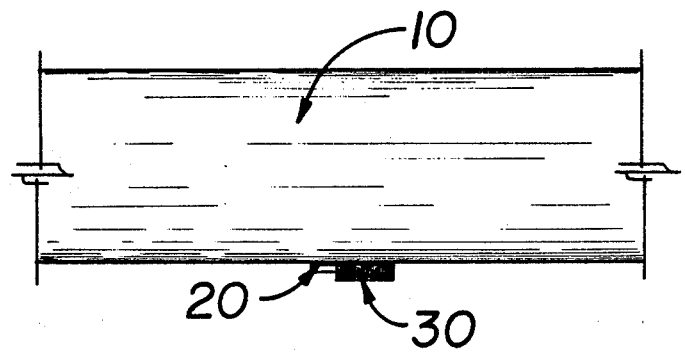
FIG. 1 is a plan view of gated pipe to which is attached a preferred embodiment of the water diffusing and control apparatus of the present invention.
Figure 2:
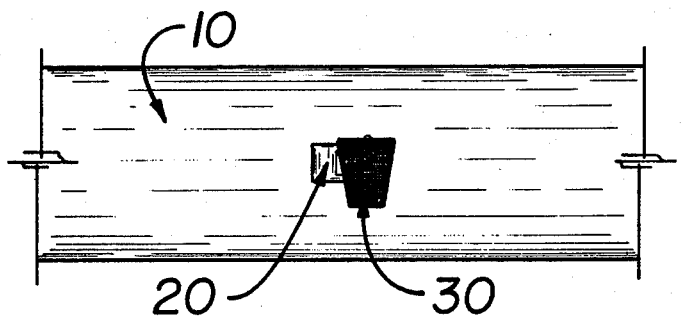
FIG. 2 is a side elevation of the apparatus of FIG. 1.

Referring now to the drawings, and, more particularly, to FIGS. 1 and 2, an embodiment to be preferred of the water control and diffusion apparatus of the present invention is disclosed. The apparatus includes generally, a slotted gate retainer 20 and a water diffuser 30 attached thereto. Diffuser 30 is connected to gate retainer 20 which, in turn, is connected to gated irrigation pipe 10.

Figure 3:
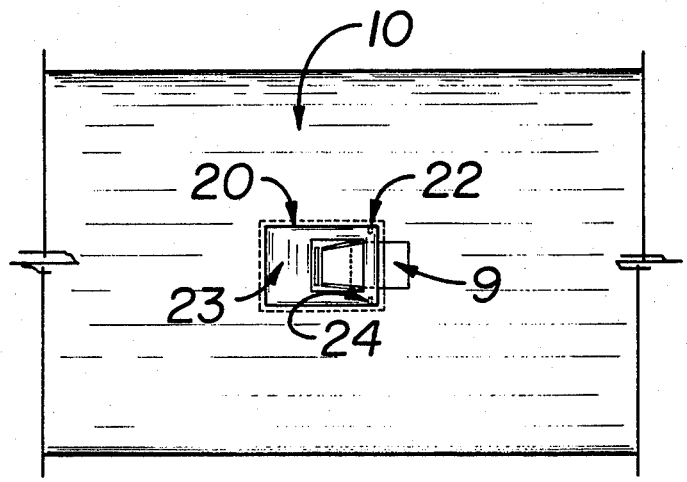
FIG. 3 is a close-up view of the slotted gate retainer of the present invention shown partially covering an opening within the pipe.

Referring now to FIGS. 3, 4 and 5, it will be seen that the gate retainer 20, shown to advantage in FIG. 3, slidingly engages the wall of irrigation pipe 10 as it moves laterally in the direction of the arrows to selectively open and close opening 9 in the wall of the pipe to meter a desired amount of water.

Gate retainer 20 is conventional in the art except as to providing means for attachment of diffuser 30. For this purpose, one or more slots 22 are bored or formed downwardly into the retainer housing 23 for reception of one or more pins mounted on the diffuser, as will hereinafter be explained. The gate retainer is most often reversible simply by rotating it 180° and, for this reason, slots 24 may also be bored or formed within the housing. It is obvious that the pin-slot arrangement of diffuser and retainer may be readily reverse with the same practical effect.

Water diffuser 30, in the preferred embodiment includes a substantially inverted U-shaped framework having a horizontal top member, flange 35, and a pair of oppositely disposed and downwardly depending side members, flanges 36. In combination with a water porous covering 37 the framework defines a channeled or trough-like water diffuser. The porous covering 37 is preferably in the form of a series of spaced fine meshed screens. In the preferred embodiment, as shown in FIG. 4, the covering consists of eight thicknesses of fine meshed screen and is integral with the framework; the framework, also consisting of fine meshed screen, being molded into a top flange and a pair of side flanges.

Referring to FIG. 7, another embodiment of water diffuser 30 is disclosed. In this embodiment, top member 35 and side members 36 are formed of solid material such as plastic. Layers of bristles 37 form the covering. The bristles may be made of any suitable material such as nylon, fiberglass, metal, or the like.

Means for attaching diffuser 30 to gate retainer 20 is preferably in the form of a single pin 32 centered and downwardly depending from top flange 35. The pin is received within slot 22 of the gate retainer. The pin may include a knurled surface for engaging the side walls of the slot for holding the diffuser in place. It is obvious that the retainer, if desired, may include a plurality of slots and the diffuser a plurality of pins, however it has been found that a single pin-slot arrangement holds the diffuser in place and expedites placement or removal of the diffuser from the gate retainer.

A common screw has proven effective for use as a knurled pin.

In use, the diffuser 30 is first attached to slotted gate retainer by simply slipping pin 32 into slot 22 of the retainer. In this manner, a portion of the diffuser frame contacts the retainer and a portion of the diffuser overlaps opening 9 in irrigation pipe 10. Water, which strikes the diffuser with considerable force, tends to force the diffuser outwardly causing pin 32 to engage the walls of slot 22, holding the diffuser tightly to the gate retainer. The layers of bristles or screens together with the adhesive and cohesive nature of water dissipate the cutting force of the water, preventing erosion and maintaining the corrugates. As the water strikes the screen or bristles, it will be seen that the back of covering 37, being completely open, permits self-cleaning of the diffuser of any debris which may have been carried by the water. Diffusers 30 may be made in any suitable size so as to cover opening 9 of the irrigation pipe. It will also be noted that the diffuser moves together with the gate retainer as the retainer is selectively opened or closed and therefore does not in any way impede such opening or closure.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Water diffusion apparatus for irrigation pipe comprising:
    water metering means connected to said pipe for controlling water flow therefrom;
    a water diffuser including a framework, substantially inverted U-shaped in cross section, and having a top member and a pair of oppositely disposed downwardly depending side members and one or more water diffusing elements supported by said framework to define a vertically oriented water porous cover;
    water diffuser attachment means for attaching said water diffuser to said metering means.

2. The apparatus as described in claim 1 wherein said water metering means comprises a gate retainer slidably engaging the wall of said irrigation pipe to selectively close an opening within the wall.

3. The apparatus as described in claim 2 wherein said gate retainer includes one or more slots adapted to receive said diffuser attachment means.

4. The apparatus as described in claim 3 wherein said diffuser attachment means is carried by said water diffuser and wherein said attachment means includes one or more pins receivable in said slots.

5. The apparatus as described in claim 4 wherein each of said pins are in the form of a screw having sharpened edges operable to engage the walls of each of said slots for holding said attachment means in place.

6. The apparatus as described in claim 1 wherein said water diffusing elements include a plurality of horizontally spaced fine meshed screens.

7. The apparatus as described in claim 1 wherein said water diffusing elements include a plurality of horizontally spaced bristles.

8. Water diffusion apparatus for gated irrigation pipe comprising:
    a gate retainer operable to slidingly engage the wall of said irrigation pipe to selectively open or close water dispensing openings within the wall; and
    water diffusion means attachable to said gate retainer and movable therewith; said diffusion means including a top flange, a pair of side flanges, and a water porous covering extending between flange members.

9. The apparatus as described in claim 8 wherein said cover is comprised of one or more layers of bristles.

10. The apparatus as described in claim 8 wherein said cover is comprised of one or more layers of fine meshed screen.

11. The apparatus as described in claim 8 wherein said flanges and said cover are integral with one another and are made of fine meshed screen.

12. The apparatus as described in claim 8 wherein said diffusion means includes one or more pins downwardly extending from said top flange and wherein said gate retainer is provided with one or more downwardly extending slots operable to receive one or more of said pins.

13. The apparatus as described in claim 12 wherein said pins are provided with a knurled surface for engaging the walls of slots for holding said water diffusion means in place relative to said gate retainer.

* * * * *